Nov. 10, 1931.   J. I. HULL   1,831,564
OPERATION OF ALTERNATING CURRENT DYNAMO ELECTRIC MACHINES
Filed Nov. 20, 1929
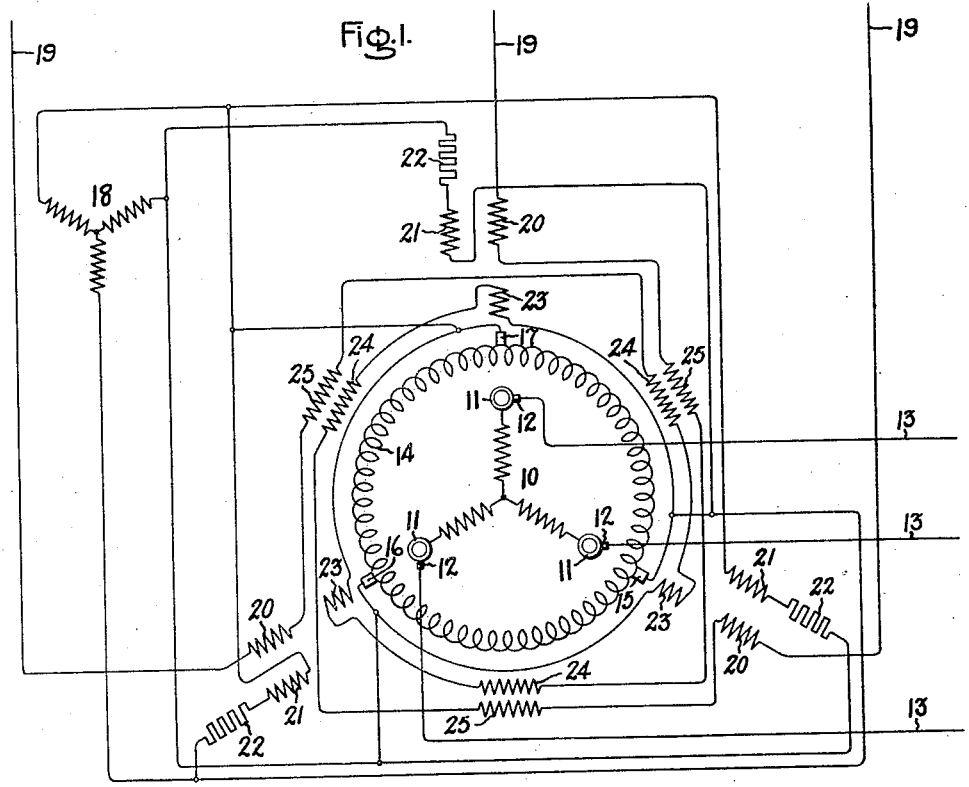
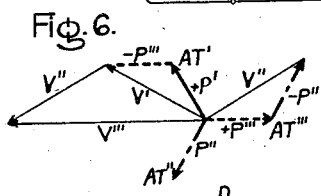
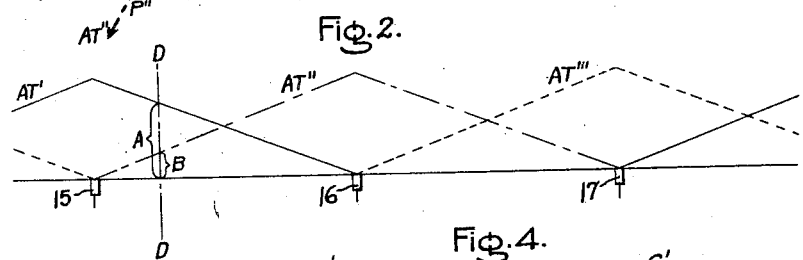
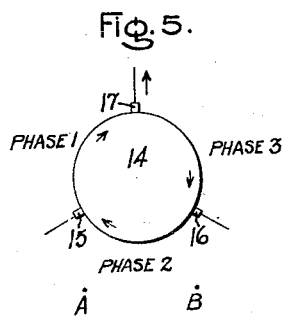
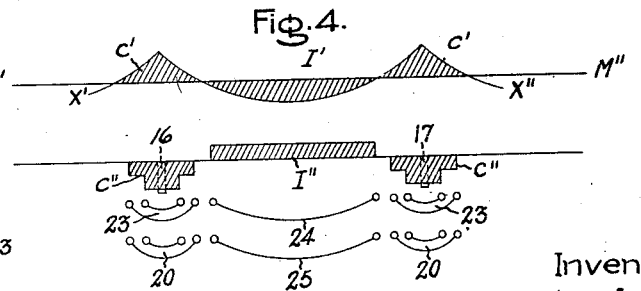
Inventor:
John I. Hull,
by Charles E. Tullar
His Attorney.

Patented Nov. 10, 1931

1,831,564

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

OPERATION OF ALTERNATING CURRENT DYNAMO ELECTRIC MACHINES

Application filed November 20, 1929. Serial No. 408,535.

My invention relates to a novel arrangement for neutralizing undesirable torques that may exist in commutator type dynamo electric machines, as for example, in commutator type frequency changers.

In industry there exists a large number of types of alternating current machinery which can be most advantageously operated at frequencies substantially below the commercial frequencies of 25 and 60 cycles. A few examples of such machinery are induction motors used for threading in operations at paper mills and other places and also vibrating devices used to operate sand sifters, ore sifters, and the like. The large and varied nature of the apparatus to be operated at the low frequencies, together with the needs of various installations, led to the use of both externally propelled and self-propelled frequency changers with many different ratings of frequency, voltage, current and kilowatt capacity. The large actual and potential demand for such various types of low frequency changers makes it desirable to employ means to neutralize undesirable torques that tend to develop in the commutated winding and overcome commutation difficulties in the commutated winding. The importance of overcoming commutation difficulties and the means for its accomplishment are well known to those skilled in the art and I prefer to illustrate one of the means used because it assists in the description of my invention but I wish it understood that my invention can also be applied to machines not provided with means for improving commutation. The undesirable torques in the commutated winding cause the frequency changer speed and hence the frequency of the voltage supplied by it to vary with its load. This results in a serious disadvantage because it is desirable that the frequency changer supply a substantially constant frequency during its load range. This serious disadvantage existed in frequency changers as heretofore constructed. In accordance with my invention this disadvantage is avoided by employing torque neutralizing windings having their axes approximately midway between the commutation zones.

The following theoretical discussion will be readily appreciated by those skilled in the art and will be of assistance in understanding my invention. If the primary of an alternating current dynamo electric machine contains a commutator connected to a winding which is either conductively or inductively related to the primary winding, then an alternating current can be taken from the commutator if the machine runs above or below its synchronous speed and the frequency of this alternating current will be equal to that percentage of the primary frequency that the slip of the machine bears to its synchronous speed. It is evident that equal frequencies will exist if the slips above and below synchronous speed are equal, but it is often desirable to operate the machine below synchronous speed to decrease the mechanical stresses and the commutator peripheral speed. In an alternating current dynamo electric machine having a commutated winding and a three phase brush system, the number of commutating zones per pair of magnetic poles is in general six, but as so aptly developed by Scherbius, this can be reduced to three if the commutated winding has a coil pitch of 120 electrical degrees and advantage is taken of this fact to economize and simplify the machine.

My invntion as applied to a frequency changer will be best understood from the following description when considered in connection with the accompanying drawings while the features of my invention which are believed to be novel and patentable are pointed out in the claims appended hereto.

Fig. 1 represents a preferred embodiment of circuit connections employing current commutation, voltage commutation, and torque neutralizing windings in a self-propelled frequency changer running below its synchronous speed and operated by three-phase, 60 cycle, alternating current and supplying three-phase, 5 cycle, alternating current which I have found gives highly satisfactory commutation and stable speed operation; Fig. 2 represents the peripheral values of the ampere turns of phases I, II, III of the commutated winding of the machine represented in Fig. 1; Fig. 3 represents a vector diagram method for determining the resultant value of ampere turns at any point on the periphery of the commutated winding; Fig. 4 represents the flux areas produced by the unequal peripheral ampere turn distribution of the commutated winding and the neutralizing flux areas produced by the novel methods of my invention. Fig. 5 illustrates the relation between the values of the current flowing in the respective phase windings and the current flowing outward through the brushes to the low frequency load lines; Fig. 6 represents a vector diagram method for determining the proper phases to which the commutating windings of any commutation zone and the neutralizing windings between the commutation zones should be connected so as to produce the neutralizing flux areas.

To simplify, I have represented in Fig. 1, a two-pole machine with three commutation zones but it will be readily appreciated that my invention is equally applicable to any even number of poles by simply adding three commutation zones for each additional pair of poles and making similar or equivalent circuit connections as shown in the respective figures.

Referring to Fig. 1, 10 represents the rotatable primary winding; 11, 12 and 13 respectively represent the collector rings, brushes and relatively high frequency input lines for the primary winding; 14 represents the commutated winding having a coil pitch of 120 electrical degrees, the winding being represented as a Gramme ring for simplification but which in practice may be of any well known construction; 15, 16 and 17 represent the three sets of brushes in the three commutation zones resting on the commutator connected to the commutated winding, but for simplification I have omitted the commutator and show the brushes resting directly on the winding; 18 represents the stationary stator secondary winding provided to make the machine self-propelling as a shunt alternating current commutator motor, this winding being connected to the brushes of the commutated winding and by selecting the proper ratio of their number of turns I obtain the desired speed; 19 represents the lines of the relatively low frequency current output; 20 and 23 represent commutating windings on the stator which affect the commutation zones for producing good current commutation; 21 represents interpole windings on the stator, also affecting the commutation zones for producing good voltage commutation; 22 represents adjustable or fixed stabilizing impedances which may be and preferably are for this modification pure resistances; 24 and 25 represent torque neutralizing windings situated on the stator approximately midway between the commutation zones.

My invention is believed to be of general application and will apply to any number of commutation zones per pair of poles but as previously described three commutation zones per pair of poles will usually be used and for this reason and also for simplification I have illustrated my invention as applied to a two pole machine having three commutation zones. It therefore follows that the commutated winding will have a coil pitch of 120 electrical degrees, this being equal to the brush span as shown by the brushes 15, 16 and 17 in Fig. 2. As I have assumed a three-phase commutated winding, therefore each phase will have an ampere turn belt of 240 electrical degrees as shown by $AT'$, $AT''$ and $AT'''$ in Fig. 2. By inspection of Fig. 2, it can be seen that we have a varying ampere turn distribution around the periphery of the commutated winding. At any point on the periphery such as DD in Fig. 2 the ampere turn values of phases I and II may be represented as A and B respectively. The resultant ampere turn value which we will call C is given by the formula $$C = \sqrt{A^2 + B^2 - 2AB \text{ cosine } e,}$$

as shown vectorially in Fig. 3. When the resultant C of Fig. 3 is evaluated from point to point on the periphery a curve similar to $X'X''$ in Fig. 4 will be obtained. For a sinusoidal distribution of ampere turns the numerical values at different points on the periphery should all be equal as on the line $M'M''$ in Fig. 4. The mean value $M'M''$ will be neutralized by the flux of the relatively high frequency current flowing in the primary winding this being like the well known phenomena of rotary converters. When the commutated winding 14 has the mean value of its ampere turn distribution represented by $M'M''$, there is no undesirable torque produced by the winding and the frequency changer runs at a substantially constant speed during its load range. Inspection of curve $X'X''$ in Fig. 4 shows that areas $C'$, $C'$ and $I'$ are so related to each other that if they are unmolested the mean value of the ampere turn distribution of the commutated winding would be represented by $M'M''$. The areas $C'$, $C'$ are in the commutation zones and will induce a voltage tending to interfere with the change in the current flowing in the commutated conductors as they move from one phase belt to another. The phenomena relating to this rapid current change is commonly termed current commutation and to this definition I will adhere throughout this application. To obtain good current commutation I provide at each commutation zone one or more commutating windings carrying currents of such phase relations and strength that their resulting flux produces the areas $C''$ and $C''$. These are slightly larger than the areas $C'$ and $C'$ so as to neutralize $C'$ and $C'$ and in addition provide a slight flux in the reverse sense of that of C' and C', so as to induce a voltage in the coil undergoing commutation equal and opposite to the self-induced voltage caused in it by the change in direction or magnitude of current in it when undergoing commutation. These commutating windings are connected in series with the low frequency load so that the areas C'' and C'' will vary with the load in the same manner as the areas C' and C' vary with the low frequency load. In Fig. 1, I have shown in each commutation zone two such commutating windings represented by 20 and 23.

The following description teaches how to determine the proper phases to which the torque neutralizing and commutating windings should be connected and for illustration I will now describe how the latter are to be connected to obtain the proper phase relation for producing areas C''. In Fig. 5, A and B represent two arbitrary points in any electrical circuit, 14 represents the commutator of the frequency changer and the brushes resting on the commutator are represented by 15, 16 and 17. In the electrical art it is often necessary to determine the resultant value and direction of two or more currents flowing through one line and therefore it is necessary to know the actual value and relative direction of the various currents. If a current of plus 100 amperes (+100 amperes) is flowing from A to B then the electrical art regards the current flowing from B to A as minus 100 amperes (−100 amperes). For illustrative purposes I am assuming that the currents in the phase windings of the commutated winding are 100 amperes and are flowing in the direction indicated by the arrows and that I wish to determine the resultant current flowing outward through the brush 17. As the current flowing in that phase winding represented between the brushes 15 and 17 is 100 amperes and the current flows in direction from 15 to 17, therefore that current will flow outward through 17 at a value of plus 100 amperes (+100 amperes). Also as the current flowing in that phase winding represented between the brushes 17 and 16 is 100 amperes and the current flows in direction from 17 to 16, therefore that current must flow inwards through the brush 17 at a value of plus 100 amperes (+100 amperes). But since I am determining the outward flow of current through the brush 17, therefore that last mentioned current is regarded as flowing outward through 17 at a value of minus 100 amperes (−100 amperes). The first thought might be that the +100 amperes and the −100 amperes balance each other, resulting in zero current flowing outward through 17, but the currents do not balance each other because at any particular instant their values are not the same due to the phase angle between them as is evident from the following description referring to Fig. 6. Let AT', AT'' and AT''' represent the ampere turns and the currents in the three phases of the commutated winding, they being 120 electrical degrees apart. For illustration, assume it is desired to produce the area C'' at the commutation zone of the brush 17 in Fig. 2. At brush 17 the ampere turns are represented by AT''', the other two phases having zero ampere turns. Now, to balance AT''' I connect one commutating winding 20 to brush 17 which has outflowing currents +P' and −P''' producing the vector resultant current V' as shown in Fig. 6. I connect the other commutating windings 23 to brush 15 which has outflowing currents +P''' and −P'' producing the vector resultant current V'' as shown in Fig. 6. By reversing V'' and combining it with V' we get the final resultant V''' as shown in Fig. 6 and it is evident that by varying the number of turns in these commutating windings the vector V''' can be made of the proper magnitude to balance AT'''. The commutating windings 20 and 23 therefore produce flux areas C'' which neutralize flux areas C' thus resulting in good current commutation.

But neutralization of flux areas C' causes the flux of the commutated winding 14 to have a mean value which is less than the value of M' M'', thus resulting in a torque between the rotor and the stator of the machine. This torque is a function of the load and is therefore undesirable because if left unneutralized it would tend to alter the speed with changes in load and this is usually undesirable in a machine of this type. To neutralize this torque I provide one or more torque neutralizing windings on the stator having their axes approximately midway between the commutation zones. These torque neutralizing coils carry currents of such phase relations and strength that their resulting magnetomotive force assists the magnetomotive force produced by the winding 14 between the commutation zones. The magnetomotive force of the torque neutralizing windings produces the flux area I'' which equals the flux area I' and since the magnetomotive force producing I'' assists the magnetomotive force of the commutated winding the resultant flux is sinusoidal as represented by M' M''. It follows that winding 14 will not develop undesirable torques and the frequency changer speed will be substantially constant during its entire load range. These coils are connected in series with the low frequency load so that the area I'' will vary with the low frequency load in the manner as the area I' varies with the low frequency load. The phases to which the torque neutralizing coils should be connected can be determined by a method analogous to the method illustrated in Fig. 6 and by varying the number of turns the area I'' can be produced. In Fig. 1 I have shown two torque neutralizing coils 24 and 25 approximately midway between the commutation zones. I wish it understood however that my invention is not limited to two such windings since it will be obvious to those skilled in the art that a different number than two may be used in various modifications of the invention.

It is well known to those skilled in the art that in an alternating current commutator machine the working flux of the machine induces a voltage and resulting current in the coil undergoing commutation by transformer action and sparking may thus result at the commutator brushes. The elimination of the above sparking is commonly termed voltage commutation and to this definition I will adhere throughout this application. To obtain good voltage commutation I provide at each commutation zone one or more interpole windings on the stator preferably in series with fixed or adjustable impedances. These interpole windings are connected across the low frequency load lines and carry currents of such strength and phase relation that their resulting flux neutralizes the working flux of the machine in the commutation zone and in addition builds up a flux equal to $$\frac{5}{60} \times \frac{60}{55}$$

of the working flux for the assumed case of a 60 cycle to 5 cycle frequency changer. This additional flux is in the reverse sense of the working flux and its function is to induce in the coil undergoing commutation a voltage approximately equal and opposite to that produced by the transformer action of the working flux of the machine which is of 5 cycle frequency in the coil undergoing commutation and which is fixed in space. The rate of transformation of this 5 cycle flux will be $$\frac{5}{60}$$

of the 60 cycle working flux and hence to balance this transformer voltage by means of a rotation voltage with the machine running $$\frac{55}{60}$$

of its synchronous speed it is necessary to have the density of the reverse flux equal to $$\frac{5}{60} \times \frac{60}{55}$$

of the working flux density. The function of the stabilizing impedances is to stabilize the current through the interpole windings and their manner of operation is so well known to the art as not to require further description. The phases to which these interpole windings should be connected can be determined by a method analogous to the method illustrated in Fig. 6. In Fig. 1 I have shown one interpole winding 21 in series with a stabilizing resistance 22 influencing each commutation zone.

While I have described my invention in connection with a self-propelled frequency changer having a three-phase, 60 cycle input; three-phase, 5 cycle output; two poles and three commutation zones; with both primary and secondary windings connected in star; with a rotatable primary and stationary secondary and employing separate windings for the primary and commutated windings, yet I wish it to be understood that the broad scope of my invention will be equally applicable to any alternating current dynamo electric machine having a commutated winding irrespective of the number of phases or frequency of the input or output, number of poles or commutation zones, method of connections of either primary or secondary, which member of the machine is to be rotatable and whether a common or separate windings are employed for the primary and commutated windings, and therefore I do not wish to limit my invention to the particular arrangement herein described.

In accordance with the provisions of the patent statutes, I have described the principles of operation of my invention together with the apparatus which I now consider to represent the best embodiment thereof, but I desire to have it understood that such other modifications as fall fairly within the true spirit and scope of my invention are intended to be included within the scope of the appended claims.

What I claim as new and desire to secure by Letters Patent of the United States, is:—

1. A dynamo electric machine comprising relatively rotatable members, a commutated winding on one of said members having a non-sinusoidal ampere turn distribution, brushes cooperating with the commutator, leads connected to said brushes for carrying the load current of said commutated winding, and winding means for said other member energized by a current whose magnitude is substantially directly proportional to the current flowing in said leads for producing between adjacent commutation zones in said other member a flux which combines with the flux produced by the commutated winding between said zones to give a resultant flux which is substantially equivalent to the flux that would be produced between said zones by a commutated winding having a sinusoidal ampere turn distribution.

2. A dynamo electric machine comprising relatively rotatable members, a commutated winding on one of said members having a non-sinusoidal ampere turn distribution, brushes cooperating with the commutator, leads connected to said brushes for carrying the load current of said commutated winding, at least one winding situated with its axis approximately midway between adjacent commutation zones on said other member, and means for connecting said last mentioned winding in series with one of said leads so that the current flowing through said last mentioned winding produces in said other member a flux which combines with the flux produced by the commutated winding between said zones to give a resultant flux which is substantially equivalent to the flux that would be produced between said zones by a commutated winding having a sinusoidal ampere turn distribution.

3. A dynamo electric machine comprising relatively rotatable members, a commutated winding on one of said members having a nonsinusoidal ampere turn distribution, brushes cooperating with the commutator, leads connected to said brushes for carrying the load current of said commutated winding, two windings situated with their axes approximately midway between adjacent commutation zones on said other member, and means for connecting each of said last mentioned windings in series with a different one of said leads so that the currents flowing through said last mentioned windings produce in said other member a flux which combines with the flux produced by the commutated winding between said zones to give a resultant flux which is substantially equivalent to the flux that would be produced between said zones by a commutated winding having a sinusoidal ampere turn distribution.

4. A self propelled frequency changer of the commutator type having a primary rotor member provided with a commutated winding having nonsinusoidal ampere turn distribution, brushes resting on the commutator, low frequency load lines supplied from said brushes, a secondary stator winding connected across said brushes for causing said machine to be self propelling, voltage commutation windings on the stator adjacent to each commutation zone and connected across the brushes, a pair of current commutation windings on the stator adjacent to each commutation zone connected in series with different load circuits, and a pair of torque neutralizing windings on the stator situated approximately midway between each commutation zone and connected in series with different load circuits.

In witness whereof, I have hereunto set my hand this 19th day of November, 1929.

JOHN I. HULL.